(12) United States Patent
Palfenier

(10) Patent No.: US 6,249,118 B1
(45) Date of Patent: Jun. 19, 2001

(54) TARGET WHEEL SENSOR

(75) Inventor: Samuel Roland Palfenier, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/447,484

(22) Filed: Nov. 23, 1999

(51) Int. Cl.[7] ................................ G01P 3/48; G01B 7/30
(52) U.S. Cl. ..................................... 324/207.15; 324/174
(58) Field of Search ........................ 324/207.15, 207.16, 324/207.17, 207.2–207.25, 174, 173, 166, 160

(56) References Cited

U.S. PATENT DOCUMENTS 5,229,715 * 7/1993 Niino et al. ..................... 324/207.15

* cited by examiner

Primary Examiner—Jay Patidar

(74) Attorney, Agent, or Firm—Margaret A. Dobrowitsky

(57) ABSTRACT

A target wheel sensor includes a sensing structure (112) disposed within a hollow sensor housing (102). The sensing structure (112) has a T-shaped spool (114) that includes a pole piece holder (116) that terminates in a magnet holder (118). Moreover, a pole piece (120) and a magnet (122) are slidably engaged within the pole piece holder (16) and the magnet holder (118) respectively. The magnet (122) and the pole piece (120) are magnetically coupled so that the pole piece (120) is magnetized by the magnet. Also, the magnet (122) and the pole piece (120) are physically coupled so that they move in unison within the sensing structure (112). A metal target wheel (130) having one or more teeth (132) is provided and works in conjunction with the sensor (100). The target wheel (130) is placed in proximity to the sensor (100) and as the target wheel (130) rotates and a tooth (132) passes by the sensor (100) the force of magnetic attraction between the pole piece (120) and the tooth (132) will draw the pole piece (120) toward the target wheel (130) and into the extended position. As the target wheel (130) continues to rotate, the tooth (132) will move away from the pole piece (120) causing the magnetic force to lessen and allowing the pole piece (120) to return to the retracted position under the influence of a spring (128).

13 Claims, 2 Drawing Sheets

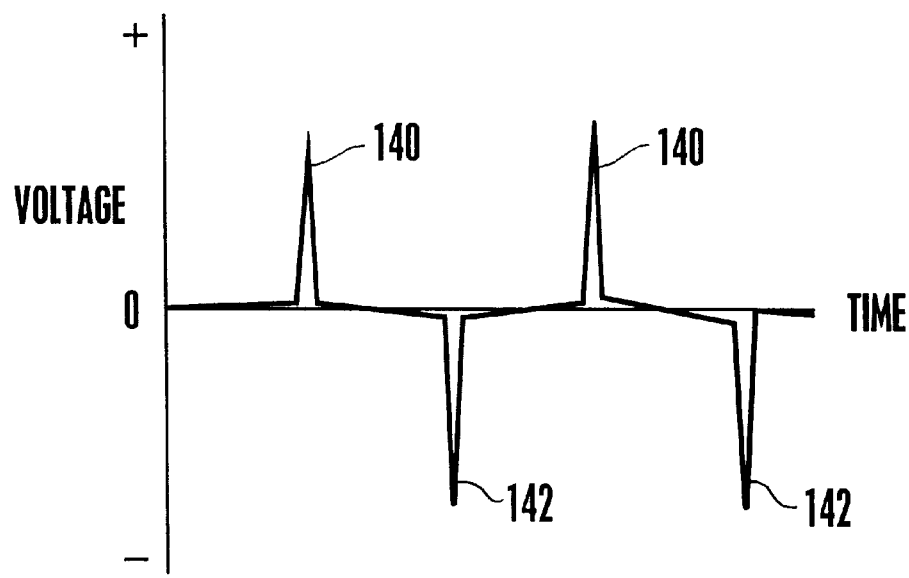
Fig. 3
Fig. 4
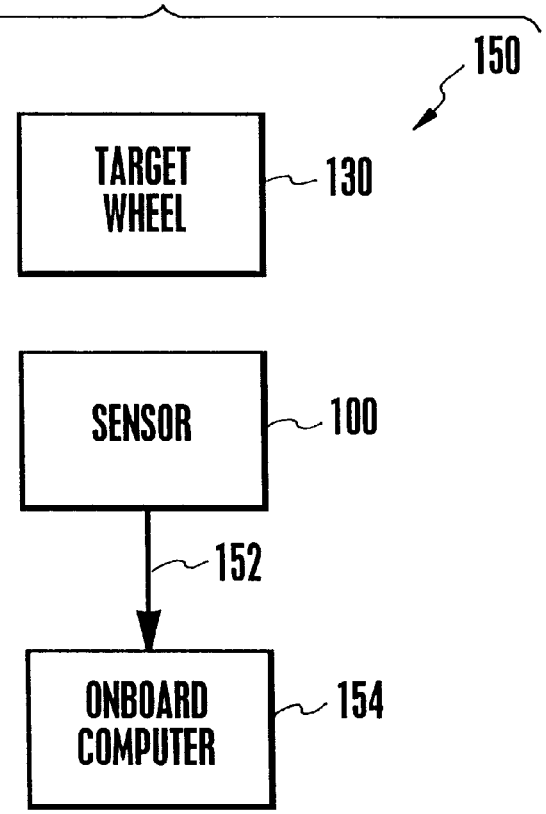

TARGET WHEEL SENSOR

TECHNICAL FIELD

The present invention relates to automotive sensors.

BACKGROUND OF THE INVENTION

In many of today's vehicles, sensors that sense a rotating target wheel may be used for different applications. For example, a target wheel may be engaged with a vehicle crankshaft for inducing signals in one or more sensors positioned next to the target wheel, with the signals representing the angular position of the crankshaft. These position signals can be used in distributorless ignition systems that have selectively energized ignition coils that fire the spark plugs as appropriate for the angular position of the crankshaft. Moreover, the crankshaft angular position signals can be used for combustion control and diagnostic functions.

Essentially, the edge of the disk-shaped wheel is varied along the periphery of the wheel in some fashion, e.g., by cutting slots in the periphery in a predetermined pattern. Usually, one or two sensors are used to detect the slots as they pass by the sensors, with the detected slot pattern being correlated to a crankshaft angular position and, when two sensors are used, also to a crankshaft direction of rotation. Unfortunately, the present state of the art sensors of the above variety may be expensive and, in turn, increase manufacturing and production costs. The present invention has recognized the above-noted problems and has provided the below solutions to one or more of the above-noted problems.

SUMMARY OF THE INVENTION

A target wheel sensor works in conjunction with a rotating target wheel that has at least one tooth. The sensor includes a hollow housing and a sensing structure that is disposed within the housing. As described below, the sensing structure includes a magnet and a pole piece magnetically coupled to each other and slidably disposed within the housing. Accordingly, the magnet and pole piece are movable in unison between a retracted position, wherein the pole piece is distanced from the tooth, and an extended position, wherein the pole piece is closely spaced from the tooth.

As envisioned in the particularly preferred embodiment set forth below, the sensing structure includes a T-shaped spool that has a pole piece holder that terminates in a magnet holder. Preferably, the pole piece and the magnet are slidably engaged with the pole piece holder and the magnet holder, respectively.

Also in a preferred embodiment, the sensor includes a coil disposed around the pole piece holder and a means for biasing the pole piece and the magnet toward the retracted position. In a preferred embodiment, this means may be a spring disposed in compression between the magnet and the coil.

Additionally, in a preferred embodiment described below, the housing includes an open distal end and the sensor includes a sealing disk extending radially outward around the pole piece holder to seal the open distal end of the housing. Furthermore, the sensor housing defines an axis, and the target wheel defines a center that is aligned with the sensor housing axis.

In another aspect of the present invention, a position sensing apparatus includes a rotatable target wheel having at least one tooth. A position sensor includes a housing having a distal end juxtaposed with the target wheel and a magnetic assembly slidably disposed in the housing. The magnetic assembly is biased toward a retracted position, wherein the magnetic assembly is disposed at a proximal location in the housing, and an extended position, wherein the magnetic assembly is disposed at a distal location in the housing.

In yet another aspect of the present invention, a target wheel sensor is used to sense a rotating target. This is accomplished by providing a rotating target wheel that has at least one tooth and a center. Also, a sensor is provided that includes a hollow housing that defines an axis and that includes a sensing structure disposed in the housing. The sensing structure includes a pole piece that is slidably disposed within the housing and is movable between a retracted position relative to the target wheel and an extended position relative to the target wheel. In this aspect of the present invention, the sensor is installed in proximity to the target wheel so that the center of the target wheel is aligned with the sensor housing axis.

The present invention will now be described, by way of example, with reference to the accompanying drawings, in which:

BRIEF DESCRIPTION OF THE DRAWINGS

FIG. 3 is a voltage diagram representing the signal generated by the sensor when the pole piece extends and retracts; and FIG. 4 is a block diagram of the present invention.

DESCRIPTION OF AN EMBODIMENT OF THE INVENTION

Figure 1:
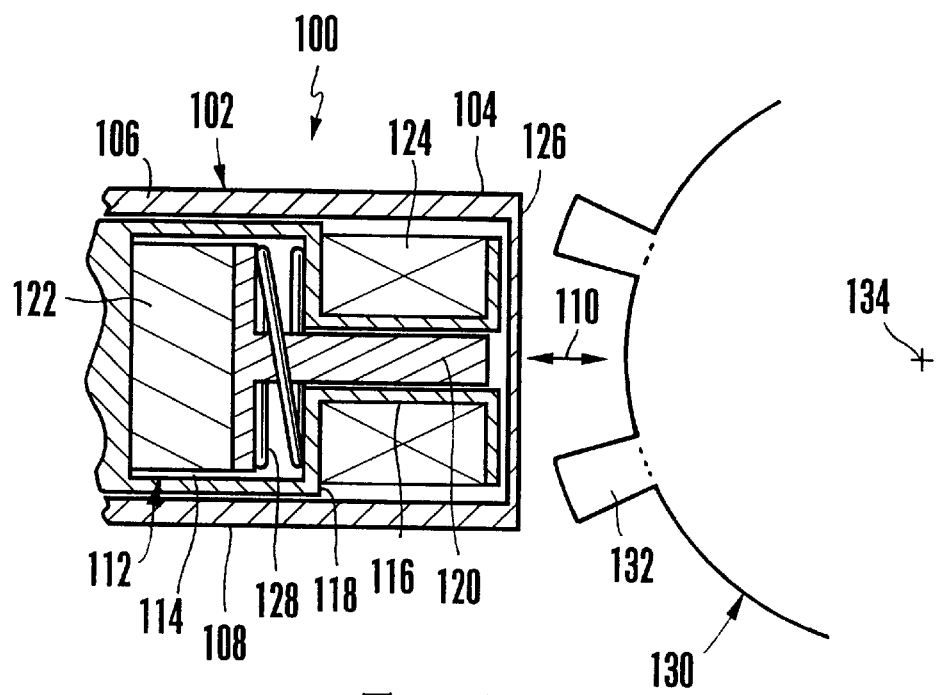
FIG. 1 is a cross-sectional view of the sensor with the pole piece in the retracted position.

Referring initially to FIG. 1, a target wheel sensor is shown and generally designated 100. The sensor 100 includes a metal, or more preferably, a plastic hollow generally cylindrical sensor housing 102 having a distal end 104, a proximal end 106, and a continuous cylindrical housing wall 108 therebetween. A sensor housing axis 110 is defined between the ends 104, 106.

Figure 2:
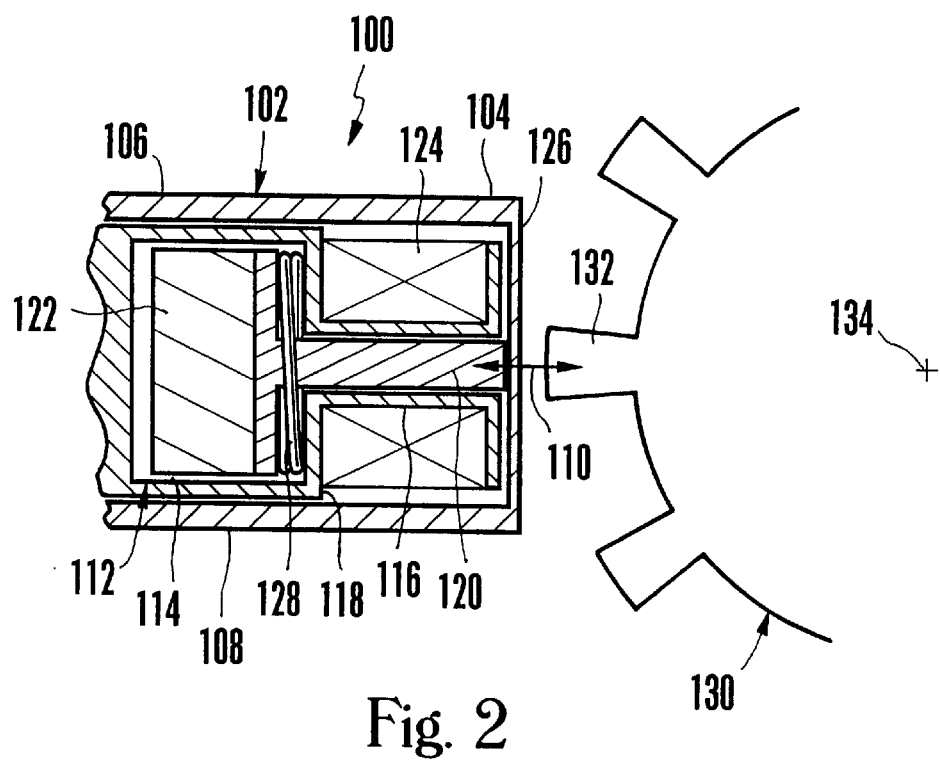
FIG. 2 is a cross-sectional view of the sensor with the pole piece in the extended position.

As shown in FIGS. 1 and 2, a sensing structure 112 is disposed within the sensor housing 102. The sensing structure 112 includes a preferably plastic, generally T-shaped spool 114 having a pole piece holder 116 that terminates in an enlarged magnet holder 118. An elongated pole piece 120 is slidably engaged with the pole piece holder 116. Similarly, a magnet 122 is slidably engaged with the magnet holder 118. In a preferred embodiment, the magnet 122 and the pole piece 120 are attached to each other so that they move in unison within the spool 114, with the pole piece 120 being magnetically coupled to the magnet 122. Together, the pole piece 120 and magnet 122 establish a magnetic assembly.

Still referring to FIGS. 1 and 2, the sensing structure 112 further includes a hollow toroidal coil 124 of wire that closely surrounds the pole piece holder 116. The interaction of the coil 124 and the magnet/pole piece 122, 120 is described in detail below. FIGS. 1 and 2 also show a sealing disk 126 that extends radially outward around the distal end of the pole piece holder 116 to cover the distal end 104 of the housing.

As also shown in FIGS. 1 and 2, a means for biasing the magnet 122 and the pole piece 120 to the retracted position, shown in FIG. 1, is installed in compression between the magnet 122 and the coil 124. Preferably, this means for maintaining the pole piece 120 and magnet 122 in the retracted position is a spring 128, but it may also be a wave washer or any other similar device.

FIGS. 1 and 2 also show a preferably metal target wheel 130 placed in proximity to the sensor 100. The metal target wheel 130 includes a plurality of teeth 132 and a center 134 that is aligned with the sensor housing axis 110 such that as the target wheel 130 rotates, clockwise or counterclockwise, around the center 134, the individual teeth 132 can align with the distal end of the pole piece 120. It can be appreciated that the target wheel 130 and the sensor 100 are distanced from each other in a manner that will allow the pole piece 120 to be magnetically attracted to the teeth 132 on the wheel 130 as it rotates.

Operation

As an individual tooth 132 of the target wheel 130 passes by the distal end 104 of the sensor 100, the force of magnetic attraction between the pole piece 120 and the metallic tooth 132 overcomes the force of the spring 128. The magnetic attraction moves the pole piece 120 from the retracted position, shown in FIG. 1, to the extended position, shown in FIG. 2. It is to be appreciated that in the retracted position, the pole piece 120 and magnet 122 are in a proximal location in the housing and distanced from the tooth 132, whereas in the extended position they are in a distal location in the housing 102 and, thus, closely spaced from the tooth 132.

As the target wheel 130 continues to rotate and the tooth 132 moves away from the sensor 100, the force of the spring 128 overcomes the magnetic force between the pole piece 120 and the tooth 132. The force of the spring 128 then returns the pole piece 120 to the retracted position, shown in FIG. 1.

As described earlier, the pole piece 120 and the magnet 122 move in unison, i.e., when the pole piece 120 moves to the extended position, the magnet 122 moves closer to the coil 124. Conversely, when the pole piece 120 returns to the retracted position under the force of the spring 128, the magnet moves away from coil 124.

Referring now to FIG. 3, the movement of the magnet 122 toward the coil 124 creates a change in magnetic flux around the coil 124 which, in turn, induces a voltage in the coil 124, represented by the positive spikes 140 in FIG. 3. Similarly, the movement of the magnet 122 away from the coil 124 also creates a change in magnetic flux around the coil 124, and induces a voltage in the coil 124, represented by the negative spikes 142 in FIG. 3, having a polarity opposite that of the previously induced voltage.

Referring to FIG. 4, a block diagram of the present invention is shown and generally designated 150. The sensor 100 and the target wheel 130 are installed in closed proximity to each other so that as the target wheel 130 rotates the sensor 100 will react as described above.

FIG. 4 shows that the signals 152 generated by the sensor 100 can be supplied to a vehicle on-board computer 154 that can process the fluctuation of the signals 156, between positive and negative, as described above and shown in FIG. 3, to determine information vital to the operation of the vehicle. It can be appreciated that, depending on where the sensor 100 and the target wheel 130 are installed on the motor vehicle, this information may include engine rpm, vehicle speed, etc.

As understood by the present invention, by using the slidable pole piece 120 and magnet 122 in conjunction with the coil 124 and target wheel 130, electric signals can be generated within the coil 124 and processed by a vehicle on-board computer to determine information crucial to proper operation of the vehicle. This type of sensor is inexpensive and easy to manufacture and can replace more expensive magneto resistive sensors, thus reducing overall manufacturing costs.

While the particular target wheel sensor as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A sensor that works in conjunction with a rotating target wheel (130) having at least one tooth (132), the sensor comprising:

a hollow housing (102); and a sensing structure (112) disposed within the housing (102), the sensing structure (112) including a magnet (122) and a pole piece (120) magnetically coupled together and slidably disposed in the housing (102), the magnet (122) and pole piece (120) movable in unison between a retracted position, wherein the pole piece (120) is distanced from the tooth (132), and an extended position, wherein the pole piece (120) is closed spaced from the tooth (132).

2. The sensor of claim 1, wherein the sensing structure (112) comprises a T-shaped spool (114) including a pole piece holder (116) terminating in a magnet holder (118), the pole piece (120) and the magnet (122) slidably engaged with the pole piece holder (116) and the magnet holder (118), respectively.

3. The sensor of claim 2, further comprising a coil (124) disposed around the pole piece holder (116).

4. The sensor of claim 3, further comprising a means for biasing the pole piece (120) and the magnet (122) toward the retracted position.

5. The sensor of claim 4, wherein the means for biasing is a spring (128) disposed in compression between the magnet (122) and the coil (124).

6. The sensor of claim 1, wherein the housing further includes an open distal end (104) and the sensor (100) further includes a sealing disk (126) extending radially outward around the pole piece holder (116) to seal the open distal end (104) of the housing (102).

7. The sensor of claim 1, wherein the sensor housing (102) defines an axis (110), and the target wheel (130) defines a center (134) aligned with the sensor housing axis (110).

8. A position sensing apparatus, comprising:

a rotatable target wheel (130) having at least one tooth (132); and a position sensor (100), the position sensor (100) including a housing (102) having a distal end (104) juxtaposed with the target wheel (130) and a magnetic assembly slidably disposed in the housing (102), the magnetic assembly being biased toward a retracted position, wherein the magnetic assembly is disposed at a proximal location in the housing (102), and an extended position, wherein the magnetic assembly is disposed at a distal location in the housing (102).

9. The apparatus of claim 8, wherein the magnetic assembly includes a magnet (122) and a pole piece (120), and the apparatus further comprises a holder (116) in the housing and slidably supporting the magnetic assembly.

10. The sensor of claim 9, further comprising a coil (124) disposed around the holder (116).

11. The sensor of claim 10, further comprising a spring (128) disposed within the housing (102) in compression between the magnet (122) and the coil (124).

12. A method for sensing a rotating target, comprising the acts of:

providing a rotating target wheel (130) having at least one tooth (132) and a center (134);

providing a sensor including a hollow housing (102) defining an axis (110) and a sensing structure (112) disposed within the hollow housing (102), the sensing structure comprising a pole piece (120) slidably disposed in the housing (102), the pole piece (120) being movable between a retracted position relative to the target wheel (130) and an extended position relative to the target wheel; and installing the sensor (100) in proximity to the target wheel (130) so that the center (134) of the target wheel (130) is aligned with the sensor housing axis (110).

13. The method as in claim 12, further comprising the act of:

biasing the pole piece toward the retracted position.

* * * * *